(12) United States Patent
Brouwer et al.

(10) Patent No.: US 7,836,553 B2
(45) Date of Patent: Nov. 23, 2010

(54) HINGE CONSTRUCTION AND MOTOR VEHICLE EXTERIOR MIRROR UNIT

(75) Inventors: Stefan Frits Brouwer, The Hague (NL); Paulus Gerardus Maria Van Stiphout, Woerden (NL)

(73) Assignee: MCi (Mirror Controls International) Netherlands B.V., Montfoort (NL)

( * ) Notice: Subject to any disclaimer, the term of this patent is extended or adjusted under 35 U.S.C. 154(b) by 149 days.

(21) Appl. No.: 11/817,116

(22) PCT Filed: Feb. 27, 2006

(86) PCT No.: PCT/NL2006/000100

§ 371 (c)(1),
(2), (4) Date: Dec. 5, 2007

(87) PCT Pub. No.: WO2006/091087

PCT Pub. Date: Aug. 31, 2006

(65) Prior Publication Data

US 2008/0168623 A1     Jul. 17, 2008

(30) Foreign Application Priority Data

Feb. 25, 2005 (NL) .................................... 1028416

(51) Int. Cl.
*E05D 7/00* (2006.01)
(52) U.S. Cl. ............................ 16/354; 16/362; 16/357; 248/476; 248/422; 248/183.4; 359/841; 359/871
(58) Field of Classification Search .................. 16/354, 16/362, 357–361, 235; 248/476, 477, 478, 248/479, 549, 481, 422, 183.4, 292.12; 359/838, 359/841, 844, 871, 872, 877
See application file for complete search history.

(56) References Cited

U.S. PATENT DOCUMENTS 4,001,913 A * 1/1977 Ollis et al. ..................... 16/88

(Continued)

FOREIGN PATENT DOCUMENTS

DE       4004686 C1    5/1991

(Continued)

OTHER PUBLICATIONS

International Searching Authority; PCT/NL2006/000100; International Search Report dated May 24, 2006.

(Continued)

*Primary Examiner*—Victor Batson
*Assistant Examiner*—Emily M Morgan
(74) *Attorney, Agent, or Firm*—Dykema Gossett PLLC

(57) ABSTRACT

A hinge construction for a wing mirror unit for a motor vehicle including a first hinge part for mounting on a motor vehicle and a second hinge part, pivotably connected therewith, for supporting a wing minor unit. In an embodiment, the first and second hinge parts cooperate via a rack-and-pinion guide and a drive mechanism having a disengageable coupling. The drive mechanism and the rack-and-pinion guide cause the hinge parts upon pivoting to rotate and translate relative to each other. The disengageable coupling is operatively configured to disengage the motor and the gear drive from the first hinge part. The invention also relates to a wing mirror unit provided with embodiments of a hinge construction.

10 Claims, 10 Drawing Sheets

U.S. PATENT DOCUMENTS

| | | | |
|---|---|---|---|
| 5,477,390 A * | 12/1995 | Boddy et al. | 359/841 |
| 5,497,273 A * | 3/1996 | Kogita et al. | 359/843 |
| 5,886,838 A * | 3/1999 | Kuramoto | 359/841 |
| 6,022,113 A * | 2/2000 | Stolpe et al. | 359/841 |
| 6,213,609 B1 * | 4/2001 | Foote et al. | 359/841 |
| 6,394,616 B1 | 5/2002 | Foote | |
| 6,493,906 B2 * | 12/2002 | Matteau | 16/358 |
| 6,742,756 B1 * | 6/2004 | Fimeri et al. | 248/479 |
| 2003/0011907 A1 * | 1/2003 | Yamauchi et al. | 359/872 |

FOREIGN PATENT DOCUMENTS

| | | |
|---|---|---|
| DE | 4242964 A1 | 6/1994 |
| EP | 0686524 A1 | 12/1994 |
| FR | 2759044 A1 | 8/1998 |
| WO | WO0246000 A1 | 6/2002 |
| WO | WO2004091975 A1 | 10/2004 |

OTHER PUBLICATIONS

International Searching Authority; PCT/NL2006/000100; Written Opinion of the International Searching Authority dated May 24, 2006.

* cited by examiner

HINGE CONSTRUCTION AND MOTOR VEHICLE EXTERIOR MIRROR UNIT

The invention relates to a hinge construction, in particular for a wing mirror unit of a motor vehicle, comprising a first hinge part for mounting on a motor vehicle and a second hinge part, pivotably connected therewith, for supporting a wing mirror unit.

Such a hinge construction is generally known and typically comprises a first hinge part which is designed as a base plate for mounting on a door of an automobile. The base plate then mostly carries a base shaft of substantially upright orientation. The second hinge part typically comprises a mirror support, arranged so as to be pivotable about the base shaft. The mirror support carries the parts of the wing mirror unit, such as a mirror adjustment mechanism with mirror glass and a mirror cap.

By means of the hinge construction, the wing mirror unit is adjustable during use between a folded-in position, in which the wing mirror substantially abuts alongside the body of the motor vehicle, and a folded-out position, in which the wing mirror is oriented substantially transversely to the body of the motor vehicle.

Through this adjustability, the wing mirror unit can be folded in from the folded-out operating position to a folded-in position in which the mirror housing projects less far with respect to the body. In this way, for one thing, the risk of damage to the wing mirror unit when parking the vehicle can be reduced and the wing mirror can yield to some extent upon collision with an object.

Typically, the hinge construction comprises an electric drive mechanism with which the mirror housing is adjustable between the folded-in position and the folded-out position.

With a view to safety, the wing mirror unit in the folded-out position is preferably placed as closely to the body as possible. To enable the wing mirror unit to be properly folded in, however, it is desirable for the hinge parts to be placed at a greater lateral distance from the body, so that also a wing mirror unit that is of relatively thick design, upon being folded in, can still have its mirror glass ending up properly disposed alongside the body.

To resolve the contradiction between these requirements, complex constructions have previously been proposed to make the base shaft adjustable transversely to the body, so that the base shaft can be adjusted between a position situated more closely to the body in the folded-out position and a position situated farther away from the body in lateral direction in the folded-in position of the wing mirror unit.

The invention contemplates an alternative construction, with which the same advantages can be achieved. In particular, the invention contemplates a simple, reliable construction with which the advantages can be achieved in a simple, operatively reliable manner, without necessity for an actuator.

To that end, in a hinge construction according to the invention, the first and the second hinge parts roll along each other via a guide which causes the hinge parts upon pivoting to rotate and translate relative to each other. By giving the hinge parts, via the guide, one degree of freedom of rotation and at least one degree of freedom of translation relative to each other, a path can be imposed on the hinge parts with a translation component transverse to the body of the motor vehicle, while the hinge parts pivot about a substantially upright shaft.

An advantage of such a guide is that it can be used both with hinge parts that can only be pivoted manually relative to each other, and with hinge parts that are pivoted relative to each other by means of a drive mechanism.

Preferably, the guide comprises a rack-and-pinion guide with a toothed track on one hinge part and a gear wheel segment rolling along it on the other hinge part.

When the gear wheel segment is supported, restrained from rotation, by one of the hinge parts, a simple, compact construction can be realized. The gear wheel segment can then be connected with the hinge part in a rigid manner or via a disengageable coupling.

Advantageously, the toothed track comprises a curved track section. What can be achieved in this way is that the hinge construction can be returned from a folded-over position to the operating position or the folded-in position in a simple manner by means of the same drive mechanism with which the adjustment between the folded-in and folded-out positions is effected. Alternatively, for this purpose, a spring arranged between the hinge parts may be provided. What can be achieved by providing the toothed track with a section of cup-shaped configuration is that by means of the hinge construction, a wing mirror unit can not only be folded in from the folded-out position, but can also be folded over in the opposite pivoting direction.

The stability of the hinge construction can be enhanced by furthermore having the hinge parts cooperate via a path guide. Such a path guide preferably comprises one or more cooperating pairs of cams and grooves.

Elegantly, the cam of the pair is designed as a journal carried on the gear wheel segment, which journal is received in a groove whose shape corresponds to the path traversed by the journal during pivoting.

The hinge parts are preferably connected via an (electric) drive mechanism. An advantage of the construction described here is that the motor of the drive mechanism can be fitted as desired on the part to be mounted on the motor vehicle or on the part of the hinge construction to be connected with the wing mirror unit.

What can be achieved by coupling the drive mechanism disengageably with one of the hinge parts is that the drive mechanism can be uncoupled when a high adjusting force is exerted from outside on the hinge construction.

Elegantly, the drive mechanism comprises a gear wheel, in particular a worm gear wheel, which is supported, restrained from rotation, on one of the hinge parts, while the other hinge part comprises a worm cooperating therewith, driven by an electric motor.

When the gear wheel is supported on one hinge part by way of a disengageable coupling, a compact construction can be achieved. Preferably, the disengageable coupling is designed with coupling elements which are biased in radial direction relative to the bearing axis of the gear wheel.

By connecting the gear wheel via a first guide with one degree of freedom of translation with the other hinge part than the hinge part supporting the gear wheel, the translation imposed by the rack-and-pinion guide can be accommodated. Preferably, the gear wheel is furthermore connected with the other hinge part via a second sequential guide with a second degree of freedom.

The invention also relates to a wing mirror, in particular for a motor vehicle, comprising a hinge construction according to the invention, wherein the first hinge part is provided with a base plate for mounting on the body of a motor vehicle and wherein the second hinge part is provided with a wing mirror unit, and wherein the wing mirror unit is adjustable during use between a folded-in position, in which the wing mirror unit substantially abuts against the body of the motor vehicle, and a folded-out position, in which the wing mirror unit is oriented substantially transversely to the body of the motor vehicle.

Further advantageous embodiments of the invention are discussed below with reference to a drawing and are set forth in the claims.

The invention will be elucidated on the basis of exemplary embodiments which are represented in a drawing.

Figure 1:
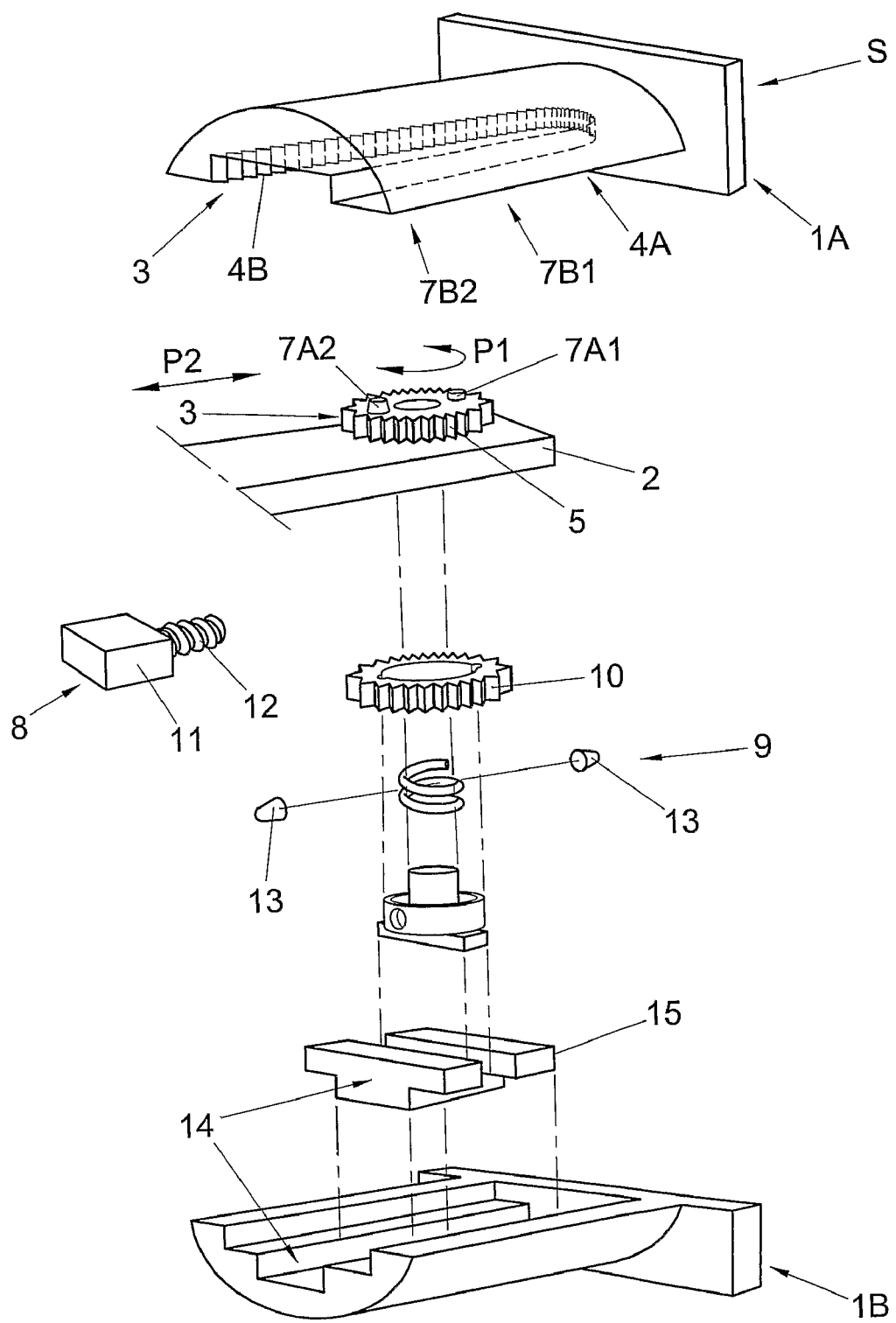
FIG. 1 shows an exploded perspective view of a first embodiment of the hinge unit according to the invention.
Figure 2:
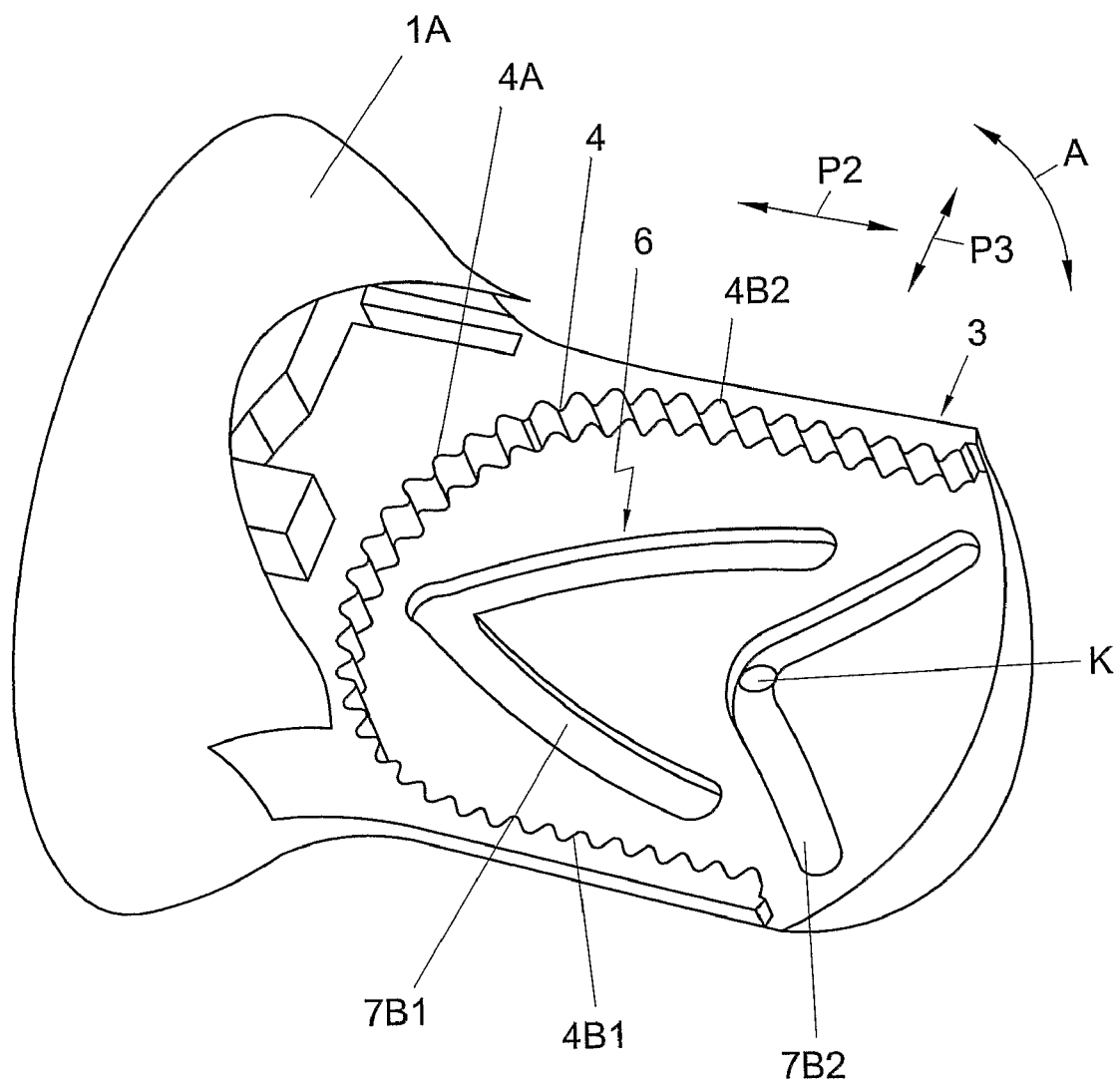
FIG. 2 shows a schematic bottom view of a first hinge part.
Figure 3:
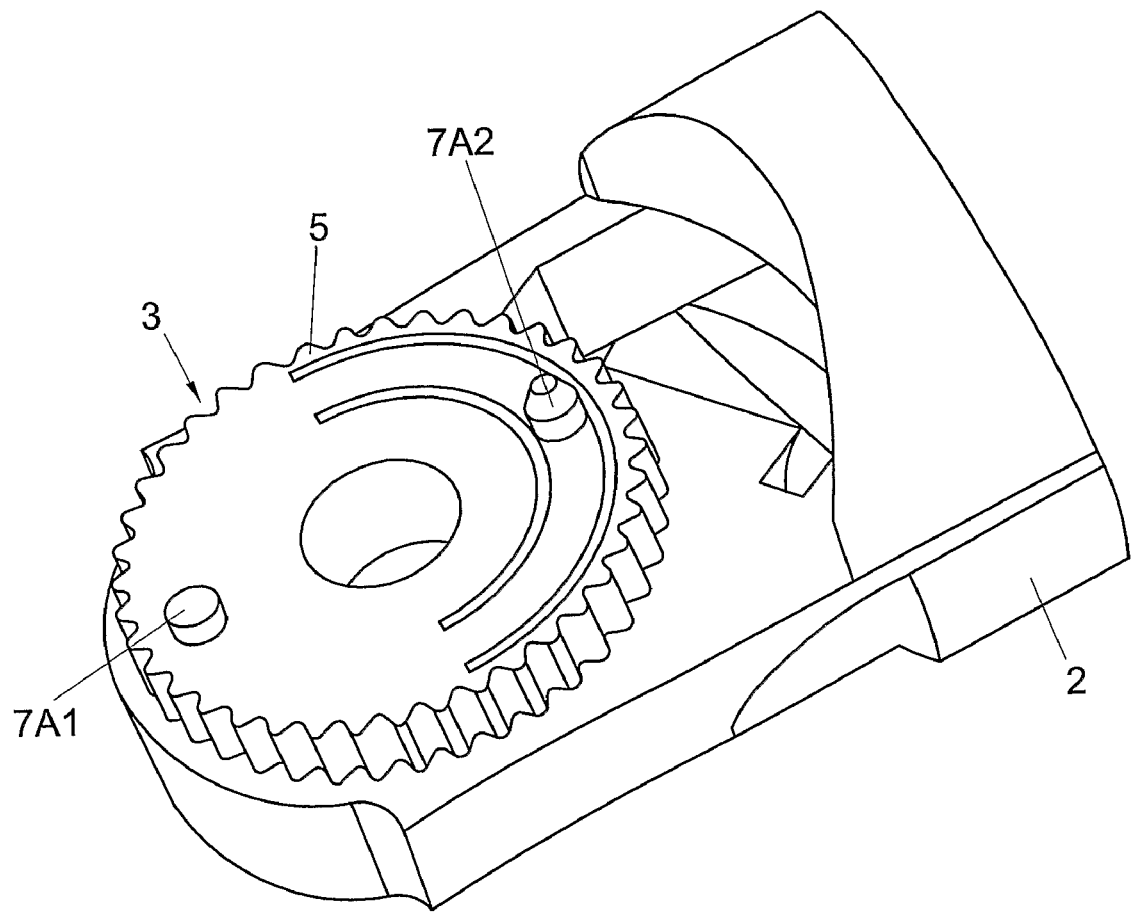
FIG. 3 shows a schematic top plan view of a second hinge part.
Figure 4:
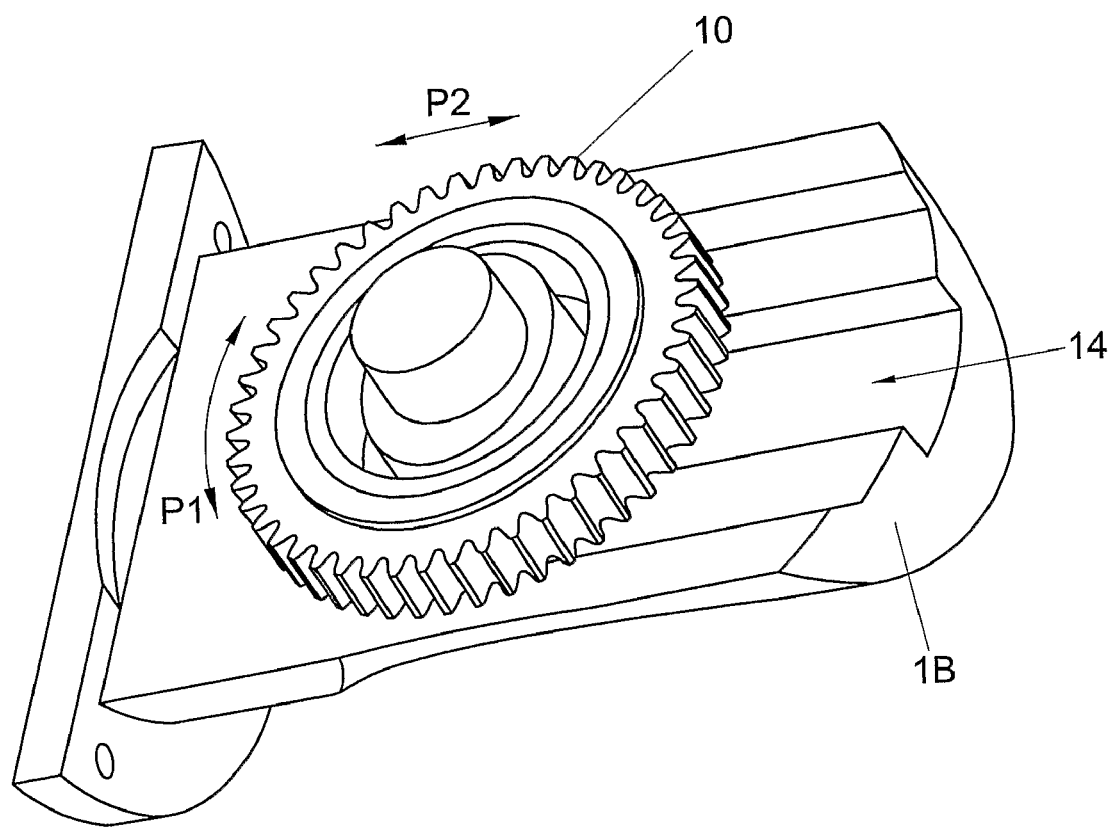
FIG. 4 shows a schematic top plan view of a second portion of the first hinge part.
Figure 5A:
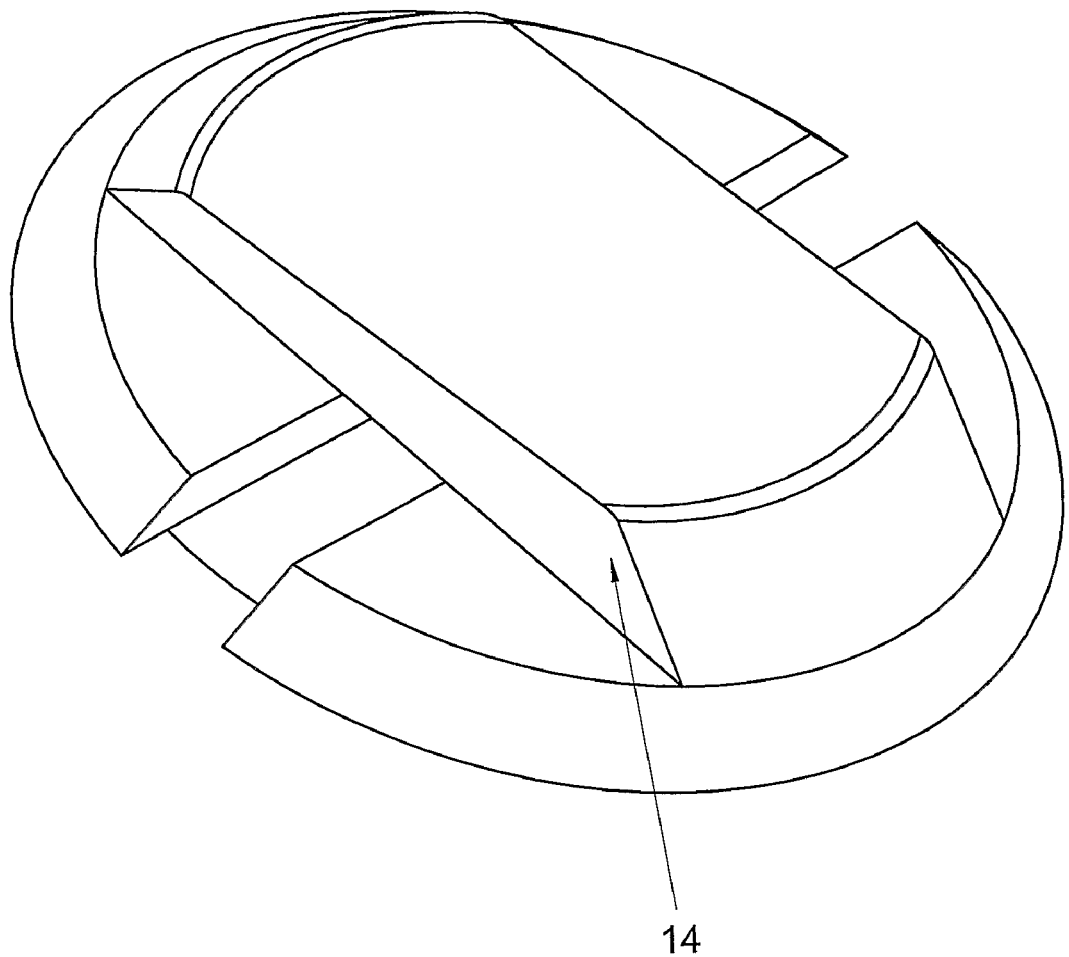
Figure 5B:
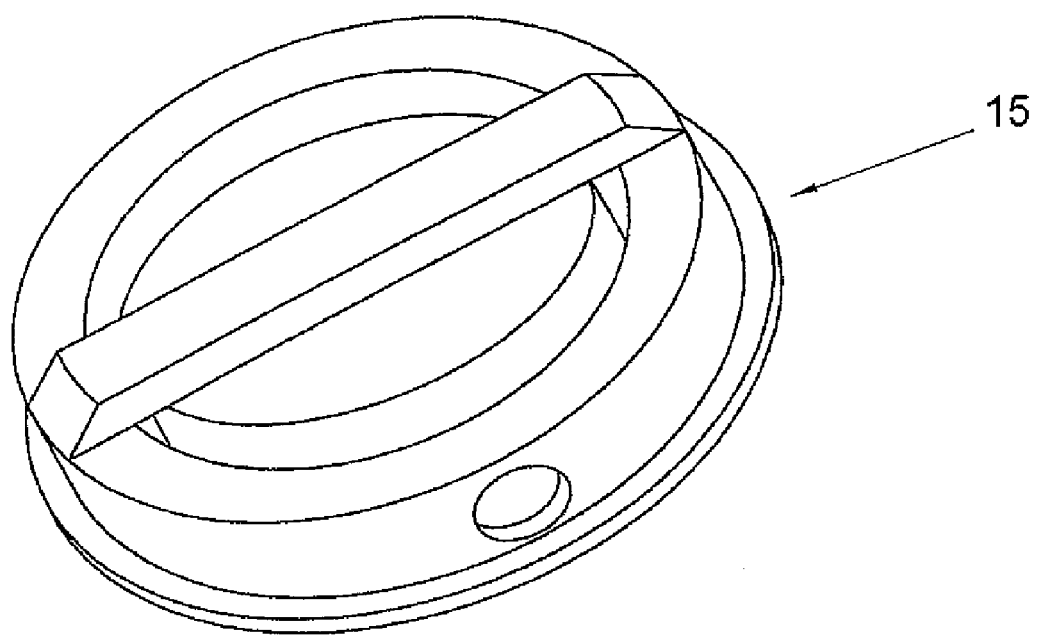
Figure 6:
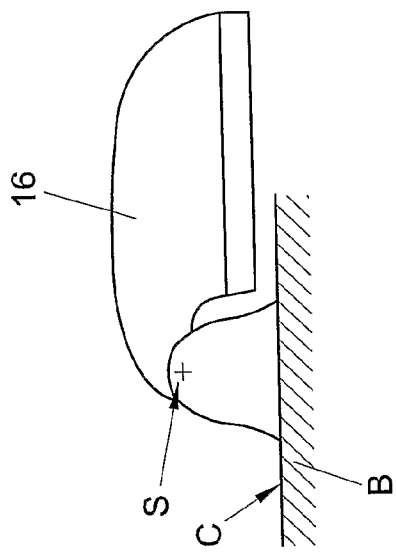
Figure 7:
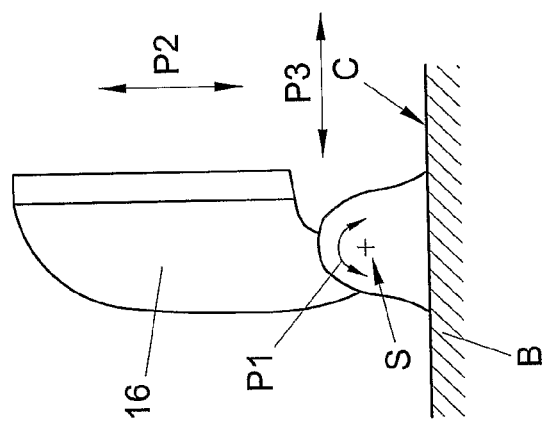
Figure 8:
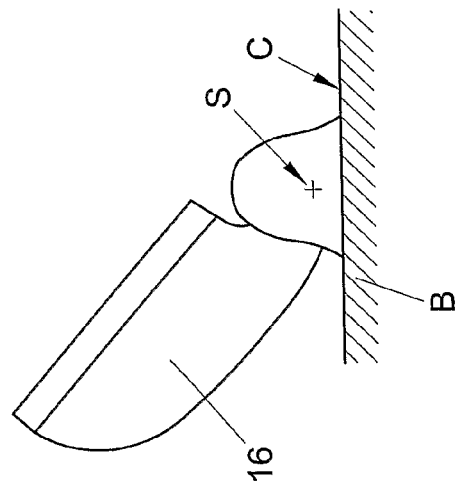
Figure 9:
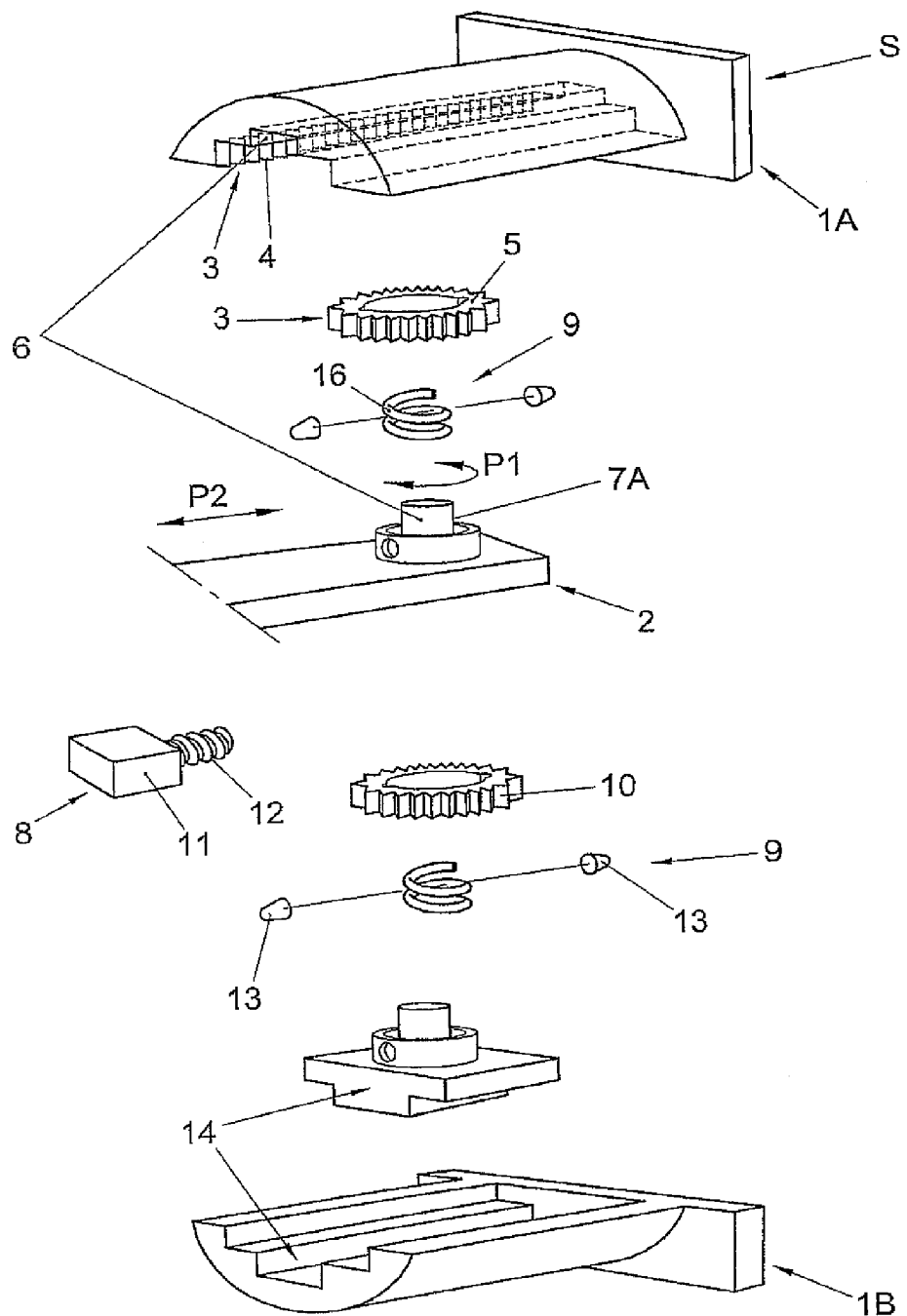
Figure 10:
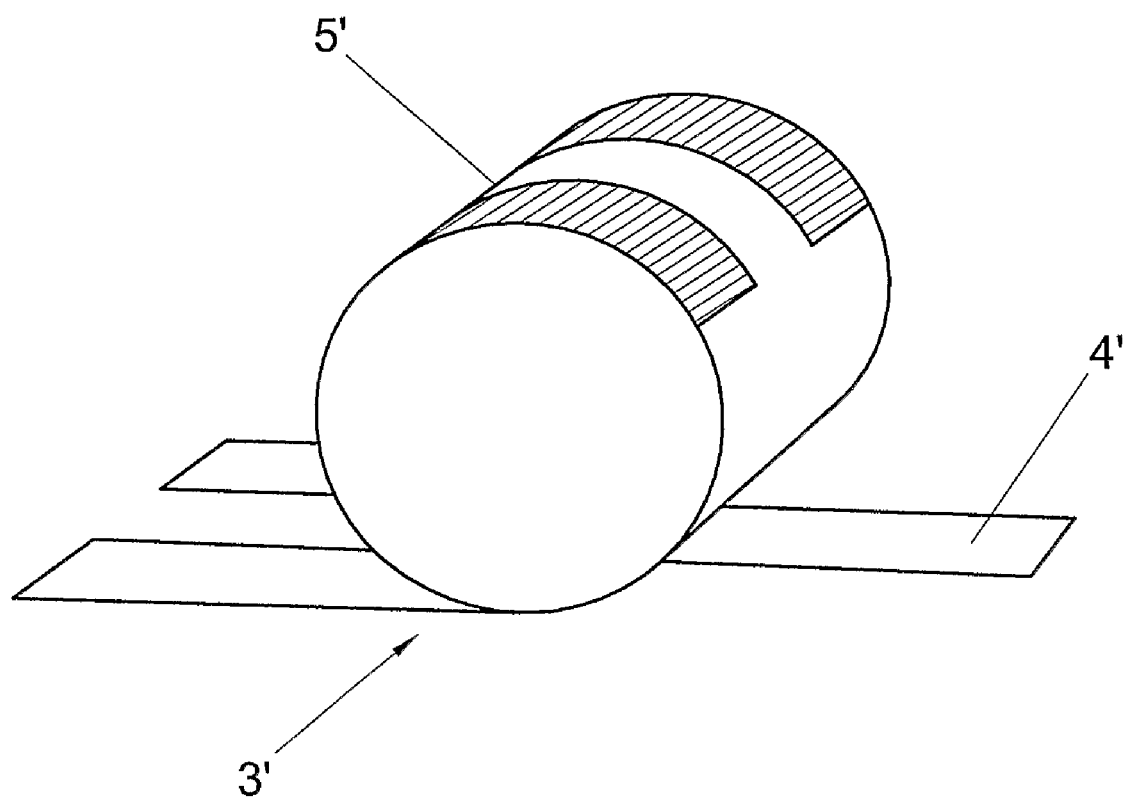

FIGS. 5A and 5B each show a perspective view of a guide part;

FIG. 6 shows a schematic top plan view of a wing mirror unit in folded-in position;

FIG. 7 shows a schematic top plan view of the wing mirror unit of FIG. 6 in folded-out position;

FIG. 8 shows a schematic top plan view of the wing mirror unit of FIG. 6 in folded-over position;

FIG. 9 shows an exploded perspective view of a second embodiment of the hinge unit according to the invention;

FIG. 10 shows a schematic perspective view of a friction roller guide; and

Figure 11:
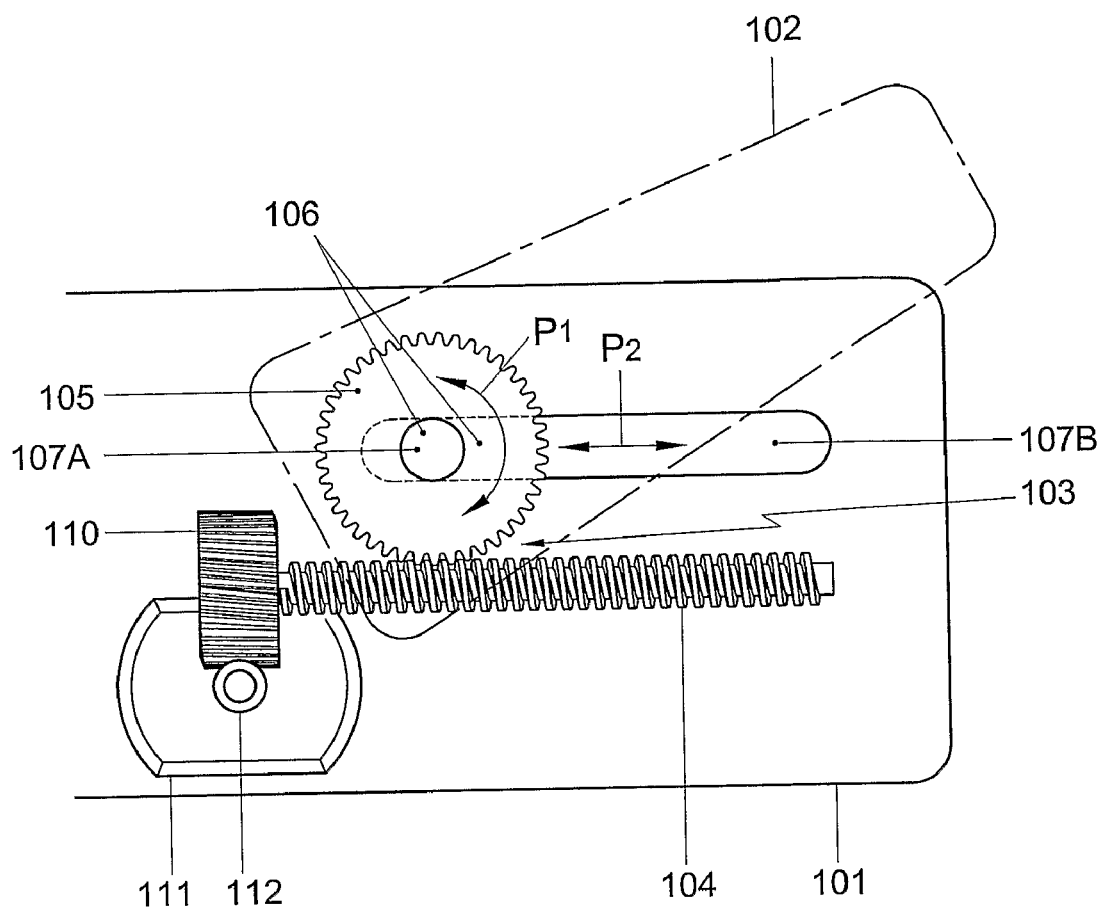

FIG. 11 shows a schematic representation of a guide for a further embodiment of a hinge construction according to the invention.

It is noted that the figures are only schematic representations of preferred embodiments of the invention that are given by way of non-limiting exemplary embodiments. In the figures, the same or corresponding parts are designated with the same reference numerals.

FIGS. 1 to 5 shows a first embodiment of a hinge construction S.

The hinge construction S comprises a first hinge part 1A, 1B for mounting on a motor vehicle and a second hinge part 2 connected therewith so as to be pivotable during use about a shaft of substantially upright orientation. The first hinge part 1A cooperates with the second hinge part 2 via a rack-and-pinion guide 3. The rack-and-pinion guide 3 causes the hinge parts 1, 2 upon pivoting to rotate relative to each other in the rotational direction indicated with double arrow P1 and to translate relative to each other in the translation direction indicated with double arrow P2.

The parts 1, 2 of the hinge construction S accordingly have one degree of freedom of rotation relative to each other and at least one degree of freedom of translation relative to each other.

The rack-and-pinion guide 3 comprises a toothed track 4 on the first hinge part 1A and a gear wheel segment 5, rolling along track 4, on the second hinge part 2. The gear wheel segment 5 in this exemplary embodiment forms part of a complete gear wheel.

The gear wheel segment 5 is supported, restrained from rotation, by the second hinge part 2. In this exemplary embodiment, the gear wheel segment is a fixed integrally formed part of the second hinge part 2.

The toothed track 4 comprises a track section 4A of curved configuration. In this exemplary embodiment, the track section 4A of curved configuration is designed as a cup-shaped track section which merges into straight track sections 4B1, 4B2, so that a guide of substantially U-shaped configuration is formed. In this way, as will be further elucidated hereinafter, the hinge parts can pivot from the folded-out position not only to the folded-in position but also in an opposite pivoting direction, to a folded-over position.

The hinge parts 1, 2 further cooperate by way of a path guide 6 which dictates the path to be followed during pivoting.

The path guide 6 in this exemplary embodiment comprises two cooperating cam and groove pairs 7. The cams 7A1 and 7A2 are here formed by journals of the gear wheel which are each received in a guide groove 7B1, 7B2 which has been recessed in the first hinge part 1. The guideways 7B1, 7B2 each correspond to the path followed by the journals 7A1, 7A2 on the gear wheel segment 5 during pivoting. What is thus achieved is that the gear wheel segment 5 remains in engagement with the toothed track 4.

One of the journals 7A2 is resiliently connected with the gear wheel segment 5. This resiliently arranged cam 7A2 cooperates with a pit K in the corresponding groove 7B2 to define the folded-out position of the hinge construction.

In the folded-out position, the gear wheel segment 5 is situated precisely in the middle of the curved section 4A of the toothed track. During folding over, the gear wheel segment 5 rolls to a point near the end of the opposite straight part 4B2 of the guide 4.

The hinge parts 1, 2 are connected via a drive mechanism 8. The drive mechanism 8 comprises a disengageable coupling 9.

The drive mechanism 8 in this exemplary embodiment comprises a worm gear wheel 10 supported on the first hinge part 1B so as to be restrained from rotation. The second hinge part 2 is rotatable relative to the worm gear wheel. The drive mechanism 8 further comprises an electric motor 11 with reduction mechanism, fitted on the second hinge part 2, of which the output shaft carries a worm 12. The worm 12 is in engagement with the worm gear wheel 10.

The disengageable coupling is arranged between the worm gear wheel 10 and the first hinge part 1. The disengageable coupling here comprises coupling elements 13 which are biased in radial direction with respect to the bearing axis of the worm gear wheel 10. When under the influence of an external force on the second hinge part via the worm 12 too large a moment is exerted on the worm gear wheel 10, the bias on the coupling element can no longer handle the moment to be transferred, and the worm gear wheel disengages, so that it is temporarily no longer rotation-locked with the first hinge part 1. The second hinge part 2 can now pivot relative to the first hinge part 1 without carrying the drive 8 along.

The worm gear wheel 10 is connected with the second hinge part 2 via two sequential guides 14, 15 with two stacked degrees of freedom of translation, for realizing a translation along the body, indicated with arrow P3. The guides 14, 15 accommodate the translation between the hinge parts 1, 2 as imposed by the rack-and-pinion guide 3.

Referring to FIGS. 6, 7 and 8, there is shown that the first hinge part 1 is provided with a base plate B for mounting on the body of a motor vehicle. The second hinge part 2 is provided with a wing mirror unit 16. The wing mirror unit 16 is adjustable by means of the hinge construction S between the folded-in position shown in FIG. 6, in which the wing mirror unit substantially abuts along the body C of the motor vehicle, and the folded-out position shown in FIG. 7, in which the wing mirror unit is oriented substantially transversely to the body of the motor vehicle.

Upon adjustment between the folded-in position shown in FIG. 6 and the folded-out position shown in FIG. 7, the hinge parts 1, 2 pivot relative to each other in the direction of the arrow P1 and the hinge parts translate relative to each other in the direction of the arrow P2.

In the figure, it can be properly seen that the centerline of the gear wheel 5, indicated with a cross, shifts relative to the body C of the vehicle as a result of the gear wheel 5 rolling along the toothed track 4 of the rack-and-pinion guide 3.

In FIG. 8 it is shown that the wing mirror unit 16 has pivoted further from the folded-out position 7 to a folded-over position.

It will be clear that the hinge construction can also be designed without drive mechanism. Furthermore, the construction can be made of yet simpler design. In this connection, reference is made to FIG. 9.

FIG. 9 shows a perspective view of a simplified form of the hinge construction S. In this embodiment, the rack-and-pinion guide 3 only comprises a straight part for rolling between the folded-in position and the folded-out position. To get from the folded-out position to the folded-over position, the gear wheel segment 5 is connected with the second hinge part 2 by way of a disengageable coupling 9.

The hinge construction can be returned manually from the folded-over position to the folded-out position. Alternatively, there may be provided a spring 16, arranged between the second hinge part and the first hinge part. In this exemplary embodiment, the spring is accommodated in the disengageable coupling 9, so that the gear wheel segment 5 winds up the spring, upon disengagement, during folding over, resulting in a resetting force which causes the hinge construction to return to the folded-out position.

In this exemplary embodiment, a single cam 7A as a central axis of the gear wheel segment 5 cooperating with a straight guide groove 7B will suffice. In this embodiment, the worm gear wheel 10 is connected with the hinge part 2 by way of a single guide with one degree of freedom of translation.

In this exemplary embodiment, the second degree of freedom of translation P3 along the body is absent. Furthermore, upon adjustment between the folded-out position and the folded-over position, no translation transverse to the body takes place.

In the hinge construction according to the invention, the guide may also be implemented in a different manner than by means of a rack-and-pinion guide. An example of this is the friction roller transmission 3, shown in FIG. 10, built up from a flexible strip 4' which has been wound onto a friction cylinder 5'.

In a further embodiment of a hinge construction according to the invention, the guide can be designed as shown in FIG. 11. In such an embodiment, the guide 103 comprises a worm transmission with a worm 104 and a worm wheel 105 in engagement therewith. Worm and worm wheel are here arranged so as to be translatable relative to each other, so that a rotation-translation converter is formed which causes the hinge parts 101, 102, during pivoting, to rotate and translate relative to each other.

As shown here, the worm wheel is arranged so as to be translatable in the direction of double arrow P2 along the longitudinal axis of the worm, and by way of a journal 107A it is received in a groove 107B of a path guide 106. Worm and worm wheel 104, 105 here form a right-angled transmission. The worm wheel 105, when rolling along the worm 104, can rotate about the journal 107 in the direction of the double arrow P2.

The guide 103 here is integrated with the drive. To that end, the guide is included in the drive train extending between the two hinge parts. In this exemplary embodiment, the worm 104 carries a further worm wheel 110 which is driven by an output worm 112 of an electric motor 111. The parts shown in the figure can then, for instance, be arranged on the first hinge part 101, while the second hinge part 102 is coupled with the translatably arranged worm wheel. Preferably, a disengageable coupling is then used, so that the hinge construction can be adjusted under the influence of an external force without thereby forcing the drive.

The invention is not limited to the exemplary embodiments represented here. Many variations are possible. In particular, the aspects of the invention that are enumerated in the partial characterizing clauses of the following claims can be mutually combined to form combinations which are not represented in the exemplary embodiment, and also such aspects may be omitted within the scope of the invention as set forth in the following claims.

The invention claimed is:

1. A hinge construction for a wing mirror unit of a motor vehicle, comprising:
    a first hinge part adapted for mounting on a motor vehicle;
    a second hinge part that is pivotally connected to the first hinge part, the second hinge part adapted to support a wing mirror unit; and
    a drive mechanism including:
        a motor engaging a worm gear wheel, the drive mechanism coupled to the first hinge part and the second hinge part, and
        a disengageable coupling disposed between the drive mechanism and the first hinge part, the disengageable coupling operatively configured to disengage the drive mechanism from the first hinge part;
    wherein the second hinge part rolls and rotates relative to the first hinge part when the motor is actuated; and the gear wheel is connected with the second hinge part via a toothed track with one degree of freedom of translation.

2. A hinge construction according to claim 1, wherein the drive mechanism comprises a worm.

3. A hinge construction according to claim 1, wherein the toothed track is defined on the first hinge part, and a gear wheel is defined on the second hinge part, the gear wheel segment being configured for rolling along the toothed track.

4. A hinge construction according to claim 3, wherein the gear wheel segment is supported, restrained from rotation, by the second hinge part.

5. A hinge construction according to claim 3, wherein the toothed track comprises a curved track section.

6. A hinge construction according to claim 1, wherein the first hinge part and the second hinge part furthermore cooperate via a path guide which dictates the path to be followed by the gear wheel segment during pivoting.

7. A hinge construction according to claim 6, wherein the path guide comprises one or more cooperating cam and groove pairs.

8. A hinge construction according to claim 2, wherein the worm gear wheel is carried on the first hinge part via a disengageable coupling.

9. A hinge construction according to claim 8, wherein the disengageable coupling comprises coupling elements that are biased in radial direction with respect to the bearing axis of the worm gear wheel.

10. A hinge construction according to claim 1, wherein the worm gear wheel is connected with the second hinge part via a sequential guide with a second degree of freedom of translation.

* * * * *